(12) United States Patent
Saperstein et al.

(10) Patent No.: US 8,265,483 B2
(45) Date of Patent: Sep. 11, 2012

(54) PARALLEL OPTICAL POLARIZATION TRACKING

(75) Inventors: Robert Saperstein, Princeton, NJ (US); Ting Wang, Princeton, NJ (US); Yue-Kai Huang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 807 days.

(21) Appl. No.: 12/203,301

(22) Filed: Sep. 3, 2008

(65) Prior Publication Data

US 2010/0054737 A1    Mar. 4, 2010

(51) Int. Cl.
*H04J 14/06* (2006.01)
*H04B 10/08* (2006.01)
*H04B 10/12* (2006.01)

(52) U.S. Cl. .............. 398/65; 398/9; 398/147

(58) Field of Classification Search .......... 398/9, 25–29, 398/38, 65, 81, 93, 147, 158, 159, 205, 208, 398/209, 213
See application file for complete search history.

(56) References Cited

U.S. PATENT DOCUMENTS

| | | | |
|---|---|---|---|
| 5,111,322 A * | 5/1992 | Bergano et al. | 398/74 |
| 5,388,088 A * | 2/1995 | Gans et al. | 398/65 |
| 2003/0147646 A1* | 8/2003 | Zitelli | 398/65 |
| 2003/0175033 A1* | 9/2003 | Taga et al. | 398/152 |
| 2004/0100695 A1* | 5/2004 | Schmidt et al. | 359/495 |

OTHER PUBLICATIONS

R. Noe, H. Heidrich, D. Hoffmann, "Endless polarization control systems for coherent optics," IEEE Journal of Lightwave Technology, vol. 6, No. 7, pp. 1199-1208 (1988).

N. G. Walker, G. R. Walker, "Polarization control for coherent communications," IEEE Journal of Lightwave Technology, vol. 8, No. 3, pp. 438-458 (1990).

F. Heismann, "Integrated-optic polarization transformer for reset-free endless polarization control," IEEE J. Quantum Electron., vol. 25, No. 8, pp. 1898-1906 (1989).

T. Ito, E. L.T. De Gabory, S. Shiori, and K. Fukuchi, "Comparison of 100Gb/s transmission performances between RZ-DQPSK and polarization multiplexed NRZ/RZ-DPSK with automatic polarization demultiplexer," Proceedings of OFC/NFOEC, conference paper JThA46, San Diego, CA, Feb. 2008.

J.X. Cai et al., "40Gb/s Transmission Using Polarization Division Multiplexing (PDM) RZ-DBPSK with Automatic Polarization Tracking", Proceedings of OFC/NFEOC 2008, Post-deadline Paper, PDP4, San Diego, CA, Feb. 2008.

C. Laperle, B. Villenueve, Z. Zhang, D. McGhan, S. Han, M. O'Sullivan, "WDM Performance and PMD Tolerance of a Coherent 40-Gbit/s Dual-Polarization QPSK Transceiver", IEEE Journal of Lightwave Technology, vol. 26, No. 1, pp. 168-175 (2008).

T. Pfau, et. al., "Ultra-fast adaptive digital polarization control in a realtime coherent polarization-multiplexed QPSK receiver," Proceedings of OFC/NFOEC 2008, Conference paper OTuM3, San Diego, CA, Feb. 2008.

* cited by examiner

*Primary Examiner* — Dawayne A Pinkney
(74) *Attorney, Agent, or Firm* — Joseph Kolodka; Bao Tran

(57) ABSTRACT

A system to communicate optical data signals in parallel includes an optical splitter to split the data signals into two polarization multiplexed (PM) signals; and two reception channels coupled to the optical splitter, where each reception channel tracks and isolates a PM signal independently.

20 Claims, 3 Drawing Sheets

PARALLEL OPTICAL POLARIZATION TRACKING

The present invention relates to parallel optical polarization tracking.

BACKGROUND

Optical communication systems are enhanced through increases in spectral efficiency (SE) to their transmitted signals. The use of orthogonal polarization states to transmit data signals in parallel, referred to as polarization multiplexed (PM) signaling, offers a valuable doubling of SE. To implement a PM system, an effective method of separating, or demultiplexing, the two PM signals at the receiver side is necessary. A most common approach for PM signal demultiplexing is to track the optical states of polarization (SOP) and rotate them via a polarization controller (PC) to align with the principal states of a polarization beam splitter (PBS). After the PBS each signal will propagate alone to an independent photoreceiver channel. Hindering the demultiplexing operation at the receiver are physical impairments, which reduce the orthogonality of the transmitted PM signals. With such polarization impairments, the optical tracking method cannot simultaneously align both PM signals with the principal axes of the PBS. In accordance, the PM signals are not separated perfectly, leading to PM signal crosstalk. An advanced method for isolation of non-orthogonal PM signals is required.

At present, non-orthogonal PM signal demultiplexing has been shown possible only through digital signal processing (DSP) of coherently received optical signals. In these systems digital manipulation of received signals allows for the isolation of PM signals that are not perfectly separated through physical mechanisms. These demonstrations are limited by the speed and resolution of available digitization and DSP hardware.

FIG. 1 shows a prior art optical tracking approach which utilizes an automated PC 2 that is controlled through a feedback mechanism. In this prior approach, the two outputs of the PBS 4 are directed to demultiplexed receiving channels. The system relies on the assumption of S1 and S2 orthogonality for proper signal isolation, because the PBS 4 utilizes an orthogonal basis for its output channels. However, S1 and S2 are not always orthogonal, due to impairments, thus, at a minimum, S1 or S2 is corrupted by crosstalk at its respective output.

SUMMARY

In one aspect, a system to communicate optical data signals in parallel includes an optical splitter to split the data signals into two polarization multiplexed (PM) signals; and two reception channels coupled to the optical splitter, each reception channel tracking the PM signals independently.

In another aspect, a method to communicate optical data signals in parallel includes optically splitting the data signals into a plurality of polarization multiplexed (PM) signals; and tracking the PM signals independently through a plurality of reception channels.

Implementations of the above system and method can include one or more of the following. Each reception channel is optimized independently and in parallel to provide crosstalk minimization. Each channel can include a polarization controller (PC) coupled to the optical splitter; a polarization beam splitter (PBS) coupled to the PC to optically isolate a desired signal from undesired signal; and a tracking controller to monitor crosstalk and adjust the PC through a feedback channel. The PC rotates the polarization of incoming signal relative to the polarization state basis of the PBS when crosstalk is sensed by the tracking controller. An optical tap can be connected to the PBS output to direct a portion of output light to the tracking controller. The tracking controller optically tracks the null of the undesired multiplexed signal. The PC rejects the undesired multiplexed signal at the PBS output. Each reception channel is independently optimized. Two receivers of which each is coupled to one reception channel to receive the polarization multiplexed signals in parallel.

Advantages of the preferred embodiment may include one or more of the following. The parallel optical polarization tracking system utilizes commercially available technologies and can be deployed at present to address the loss-of-polarization-orthogonality issue in systems with PM signaling. The parallel tracking system enhances the performance of optical communication systems that seek to increase the spectral efficiency (SE) of their transmitted signals through the use of multiplexed orthogonal polarization states to transmit data signals in parallel.

DESCRIPTION

Figure 2:
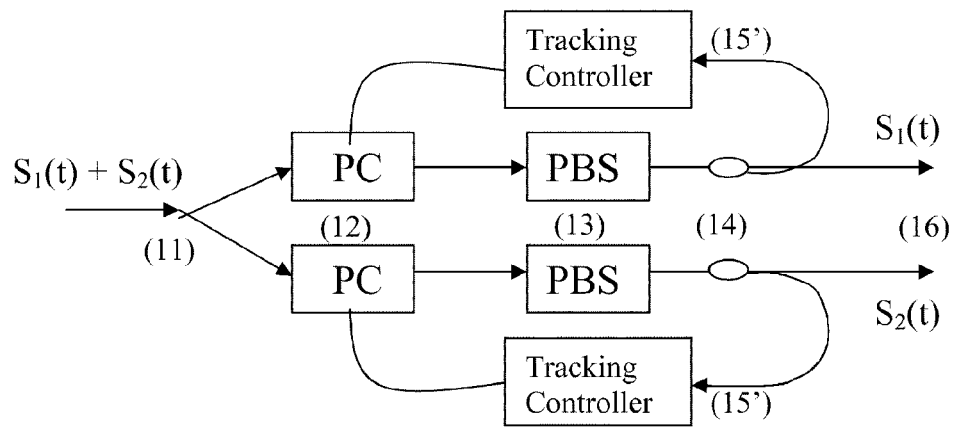
FIG. 2 shows the features of the parallel optical polarization tracking receiver front end.

FIG. 2 shows the features of the parallel optical polarization tracking receiver front end. Signals, S1 and S2, are time-variant signals containing encoded information. The two signals are in different states of polarization; however these two SOPs need not be orthogonal. At the input, a splitter 11 takes the incoming PM signals and performs a power-split between parallel detection channels, shown as upper and lower paths in FIG. 2. Here the upper path isolates signal S1 and the lower path isolates S2. An automated PC 12 is used in each channel to rotate the incoming signal to align with the fixed SOPs, i.e. polarization state basis, of a PBS 13. Ideal alignment allows for one of the PBS outputs to be directed to a photo-receiver (not shown in FIG. 2) for reception of a desired signal 16. To maintain ideal reception in each channel, a fraction of the outputs is captured by optical taps 14 which direct the light to tracking controllers 15 and 15'. These tracking controllers 15 and 15' monitor the signal to confirm that the desired signal is appropriately isolated. More precisely, they make sure that the cross-channel is appropriately nullified in the output. When crosstalk is sensed at the tracking controller, the PC 12 is modified appropriately to rotate the signal polarization relative to its PBS SOP basis 13 and re-isolate the desired signal. The upper and lower paths are shown as operating independently, without shared components after the initial splitter 11.

The optical receiver embodiments of FIG. 2 improves the practical optical tracking method for PM signal de-multiplexing by allowing for isolation of two signals with unknown SOPs, including non-orthogonal SOPs. The improvement is based on parallel reception channels for the two PM signals that are optimized and tracked (ie. modified) independently.

Figure 3:
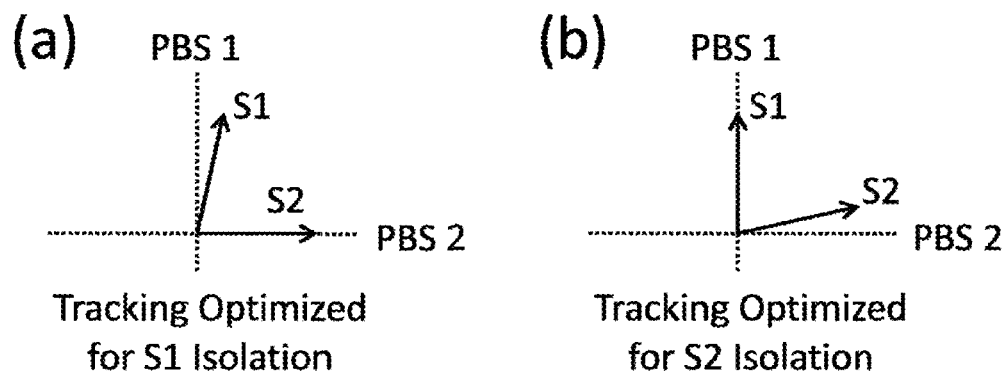
FIG. 3A represents the polarization alignment necessary in the upper channel of FIG. 2 for isolation of S1.
FIG. 3B represents the polarization alignment needed in the lower channel of FIG. 2 for isolation of S2.

A conceptualization of the parallel polarization tracking optimization is shown in FIGS. 3A and 3B. FIG. 3A represents the polarization alignment necessary in the upper channel of FIG. 2 for isolation of S1. FIG. 3B represents the polarization alignment needed in the lower channel of FIG. 2 for isolation of S2. In each plot an orthogonal polarization basis is shown for the PBS with dotted lines (PBS1 and PBS2). Orthogonality is represented by a right angle (90 degree angle) between lines. The non-orthogonal PM signals are overlaid on the PBS basis as arrows (S1 and S2). Physically, a standard PC cannot change the angle between these arrows but can change the relative angle between the arrows and the PBS basis. A lack of orthogonality between PM signals (arrows) implies that the PC cannot perfectly align the signals with the PBS basis. Thus in the prior art polarization tracking approach of FIG. 1, at a minimum, signal S1 or S2 will project onto both PBS bases leading to crosstalk and information degradation. The parallel optical polarization tracking approach operates independently in each reception channel and ensures that each PM signal is isolated. Given the lack of PM signal orthogonality, a receiver channels aligns the PM signals (arrows) such that only one signal, S1 (FIG. 3A) or S2 (FIG. 3B) passes through to one of the PBS outputs, PBS1 (FIG. 3A) or PBS2 (FIG. 3B). The signal passing this PBS basis output, which receives projection from only the PM signal of interest, is directed to the photo-receiver for that channel. Unique conditions are satisfied in the two parallel reception channels to achieve optimal alignment and to overcome the non-orthogonal PM signaling impairment. The isolation process is shown in FIG. 3A and FIG. 3B conceptually, where the signal to reject has zero projection onto the PBS basis used for reception of the desired signal.

Figure 4:
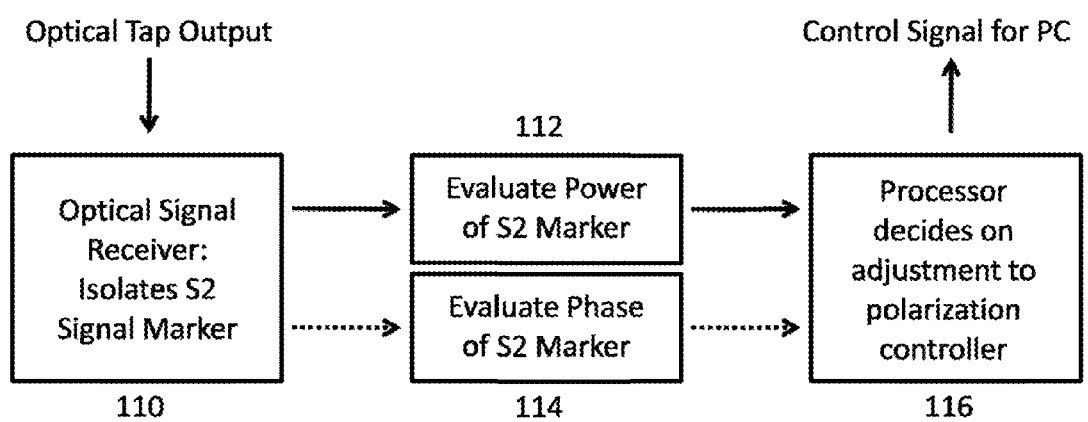
FIG. 4 shows an exemplary flowchart describing feedback mechanism for polarization tracking.

Each of the parallel channels contain its own automated polarization controller 12 and polarization beam splitter 13, which can optically isolate the desired signal from the undesired signal (for that channel) in one of the PBS outputs 13. To function in deployable optical communication networks, each channel must also utilize a tracking method 15 or 15' that monitors the absence of crosstalk and makes adjustments to the PC in accordance through a feedback channel. An embodiment of this feedback process is visualized in the flow chart of FIG. 4. To provide clarity of meaning, the flowchart is specific to the isolation of signal S1 as may be performed in the upper channel of FIG. 2. However, the flowchart concepts can be generalized to cover the tracking approach for either reception channel. FIG. 4 begins as a portion of light received in the desired PBS basis output for isolation of S1 is tapped and passed to an optical receiver (110). The optical signal receiver 10 evaluates the power of an S2 marker (112) and can optionally evaluate the phase of the S2 marker (114) as well. In this particular embodiment, the marker signal sharing the polarization of S2 is filtered out of the photocurrent while all other signal components are rejected and suppressed. The magnitude and phase of the marker signal from S2 are analyzed in 112-114, where the dashed arrows connecting the 114 pathway indicate that phase analysis may or may not be conducted. This marker information is passed to a processor, which utilizes the information to make an informed decision about how to modify the PC in order to reduce the presence of signal S2 and its marker (116). The feedback loop is complete when the processor sends a control signal to the PC and a polarization control adjustment is made. Through this loop, isolation of S1 is maintained by null tracking the marker of S2, i.e. by minimizing the presence of the S2 marker. Note again that this feedback explanation is specific to an embodiment for isolation of signal S1 in its receiver channel. Signal S2 can be similarly isolated in parallel in its receiver channel through the minimization of a marker signal associated with S1.

Figure 5:
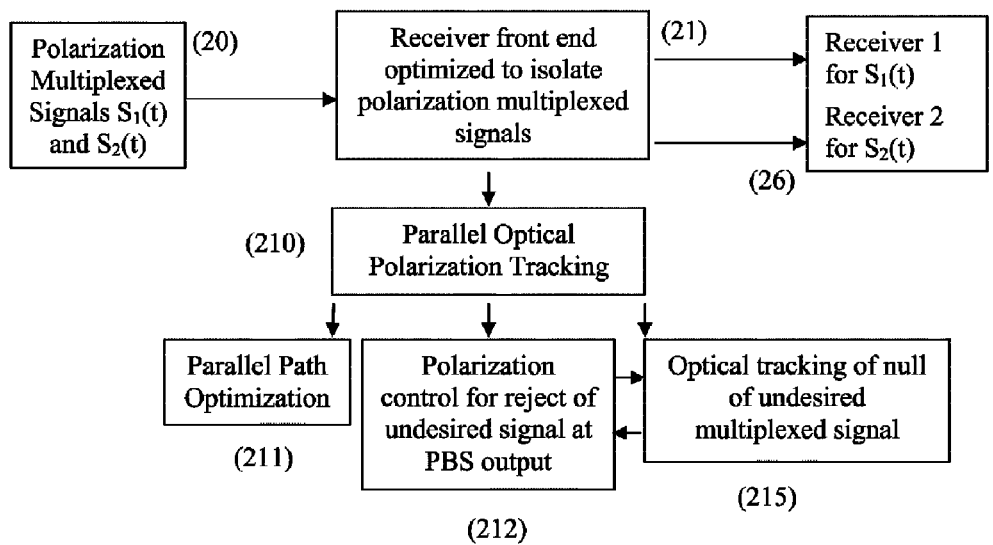
FIG. 5 shows a system for demultiplexing PM signals.

FIG. 5 shows a system for demultiplexing PM signals that offers signal isolation in the presence of loss of orthogonality between signal SOPs. This system in block 21 is a receiver front end optimized to isolate polarization multiplexed signals. Block 20 accepts polarization multiplexed signals $S_1(t)$ and $S_2(t)$, which are input PM signals with unknown SOPs. Block 21 delivers the signals to independent reception channels isolated from one another. Block 21 overcomes principal impairments for PM signaling in optical communication links by optically tracking the input SOPs of signals S1 and S2 in parallel in block 210.

In conventional optical tracking approaches, S1 and S2 are manipulated and demultiplexed jointly. When S1 and S2 lose orthogonality, these prior demonstrated systems can, at best, isolate only one of the two signals, with the second suffering from crosstalk interference. In this parallel optical polarization tracking approach, each reception channel, i.e. path for isolation of S1 and S2, is optimized independently and in parallel in block 211, ultimately allowing for complete crosstalk minimization. Within each of the two detection channel pathways, an automated PC rotates the polarization of the incoming signals until the undesired signal for that channel is orthogonally aligned to the PBS output utilized for reception in block 212. In such a way, no power for the undesired signal passes to the channel's output, i.e. channel crosstalk is minimized. This lack of crosstalk is monitored and maintained through a tracking block 215 independently operated in each detection channel pathway. The channel's feedback mechanism, demarked by the horizontal arrows at the bottom of FIG. 5, is completed when the tracker 215 controls the alignment of the automated PC 212 to maintain best signal isolation.

The system for PM signal demultiplexing augments the current optical tracking approach to allow for isolation of non-orthogonal PM signals. Parallel optical tracking is performed on copies of the incoming PM signal passing through separate reception channels. Each channel is responsible for isolating one of the two PM signals (as a simple 1 to 1 mapping, channel 1 captures PM signal 1 and channel 2 captures PM signal 2). The tracking algorithm for each channel operates to null the response from the undesired signal by aligning the undesired signal with a PBS in such a way that it transmits to only one of the PBS outputs. In this way, the channel's other PBS output will contain the desired signal without crosstalk, and it is passed to a photoreceiver for signal capture.

To enhance the description of parallel optical polarization tracking, a theoretical treatment of PM signal isolation is presented. An assumption is made here that PM signals, S1 and S2, can be thought of as a two dimensional vector. These two dimensions correspond to the two dimensions of polarization. Often this vector is called a Jones Vector in practice. In this description operations on the signal vector are performed by 2×2 matrices. In Eq. (1) a matrix operates on the PM signal vector to degrade orthogonality, i.e introduce loss-of-orthogonality, as can occur through impairments in optical transmission.

$$\begin{bmatrix} X \\ Y \end{bmatrix} = \begin{bmatrix} \cos(\gamma) & 0 \\ \sin(\gamma) & 1 \end{bmatrix} \begin{bmatrix} S_1 \\ S_2 \end{bmatrix} \quad (1)$$

A list of such causal impairments includes but is not limited to polarization dependent loss and higher order polarization mode dispersion. The angle, gamma, in the matrix corresponds to the angular departure from orthogonality between S1 and S2. Gamma is visualized as the angle between the arrows of FIGS. 3(a) and (b) subtracted from 90 degrees. At the receiver side, the PC will rotate the PM signals by an angle, theta, relative to the bases of the PBS. The matrix representing the PC rotation is added in Eq. (2).

$$\begin{bmatrix} X' \\ Y' \end{bmatrix} = \begin{bmatrix} \cos(\theta) & -\sin(\theta) \\ \sin(\theta) & \cos(\theta) \end{bmatrix} \begin{bmatrix} \cos(\gamma) & 0 \\ \sin(\gamma) & 1 \end{bmatrix} \begin{bmatrix} S_1 \\ S_2 \end{bmatrix} \quad (2)$$

For simplicity, real values are used in the rotation operator matrix, but in general complex values describe the PC polarization rotation. However, in this description the relative phase between polarization signals is not essential information. Multiplying the two operation matrices gives Eq. (3), which shows how PM signals S1 and S2 are mapped to the output signals, X' and Y', through projection on the PBS bases.

$$\begin{bmatrix} X' \\ Y' \end{bmatrix} = \begin{bmatrix} \cos(\theta)\cos(\gamma) - \sin(\theta)\sin(\gamma) & -\sin(\theta) \\ \sin(\theta)\cos(\gamma) + \cos(\theta)\sin(\gamma) & \cos(\theta) \end{bmatrix} \begin{bmatrix} S_1 \\ S_2 \end{bmatrix} \quad (3)$$

Figure 1:
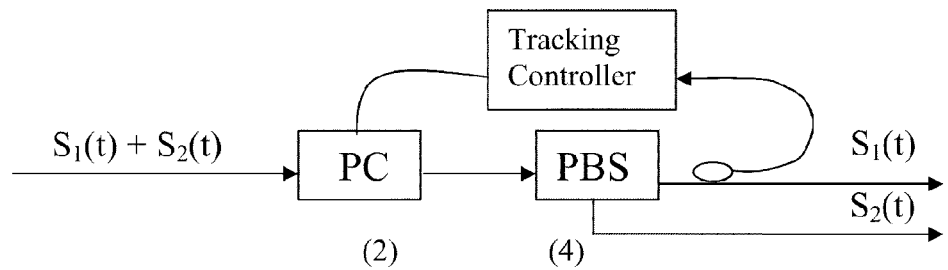
FIG. 1 shows a prior art optical tracking approach.

In the prior art polarization tracking approach of FIG. 1, the receiver must work to best isolate signals S1 and S2 from the received X' and Y' signals through a PC controlling the angle, theta. However, Eqs. (4) and (5) show the independent conditions for theta that must be simultaneously satisfied to isolate S1 and S2 in X' and Y' channels, respectively, given a finite gamma value.

$$\sin(\theta) = 0 \quad (4)$$

$$\sin(\theta)\cos(\gamma) = -\cos(\theta)\sin(\gamma) \quad (5)$$

Thus, in the prior art, at a minimum, one of the two PBS output signals, X' or Y', will contain a contribution from S1 and S2. To circumvent this signal corruption, parallel optical polarization tracking uses parallel reception channels as shown schematically in FIG. 2. As an example in the upper channel of FIG. 2, the condition in Eq. (4) is satisfied, and PBS output signal X' is captured, where X' is comprised solely of signal S1. In the lower channel of FIG. 2, the condition in Eq. (5) is satisfied, and PBS output signal Y' is captured, where Y' is comprised solely of signal S2. In contrast to the prior art, parallel optical polarization tracking provides a method for capture and isolation of PM signals in arbitrary SOPs without restriction to orthogonal SOPs. Valuable doubling of SE through PM signaling is supported even in the presence of otherwise degrading optical impairments.

The invention may be implemented in hardware, firmware or software, or a combination of the three. The computer includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A system to communicate optical data signals in parallel, comprising:
   a. an optical splitter to split the data signals into a plurality of polarization multiplexed (PM) signals, wherein the PM signals are not required to be orthogonal to each other;
   b. a plurality of reception channels coupled to the optical splitter, each reception channel tracking the PM signals independently, and
   c. a controller coupled to each reception channel to rotate incoming signals to align signals with a predetermined polarization state basis, wherein a fraction of output light is captured by an optical tap directing light to the controller to ensure that cross-channel is nullified and wherein the controller rotates signal polarization to avoid crosstalk, wherein the controller rotates a signal polarization relative to its PBS optical state basis when crosstalk is detected.

2. The system of claim 1, wherein each reception channel is optimized independently and in parallel to provide crosstalk minimization.

3. The system of claim 1, wherein each channel comprises:
   a. a polarization controller (PC) coupled to the optical splitter; and
   b. a polarization beam splitter (PBS) coupled to the PC to optically isolate a desired signal from undesired signal; and
   c. a tracking controller to monitor crosstalk and adjust the PC through a feedback channel.

4. The system of claim 3, wherein the PC rotates a signal polarization relative to its PBS optical state basis when crosstalk is sensed by the tracking controller.

5. The system of claim 3, comprising an optical tap to direct a portion of output light to the tracking controller.

6. The system of claim 1, wherein the tracking controller optically tracks the null of an undesired multiplexed signal.

7. The system of claim 1, wherein the PC rejects an undesired signal at the PBS output.

8. The system of claim 1, wherein each reception channel is independently optimized.

9. The system of claim 1, comprising a plurality of receivers each coupled to one reception channel.

10. The system of claim 1, wherein each receiver evaluates a power and, optionally a phase of a second signal marker, and sends an adjustment control signal to a polarization controller.

11. A method to communicate optical data signals in parallel, comprising:
   a. optically splitting the data signals into a plurality of polarization multiplexed (PM) signals, wherein the PM signals are not required to be orthogonal to each other;
   b. tracking the PM signals independently through a plurality of reception channels, and
   c. controlling each reception channel and rotating incoming signals to align signals with a predetermined polarization state basis, wherein a fraction of output light is captured by an optical tap directing light to the controller to ensure that cross-channel is nullified and wherein the controller rotates signal polarization relative to its PBS optical state basis when crosstalk is detected to avoid crosstalk.

12. The method of claim 11, comprising optimizing each reception channel independently and in parallel to provide crosstalk minimization.

13. The method of claim 11, wherein each channel comprises:
   a. a polarization controller (PC) coupled to the optical splitter; and
   b. a polarization beam splitter (PBS) coupled to the PC to optically isolate a desired signal from undesired signal; and
   c. a tracking controller to monitor crosstalk and adjust the PC through a feedback channel.

14. The method of claim 13, comprising rotating a signal polarization relative to its PBS optical state basis when crosstalk is sensed by the tracking controller.

15. The method of claim 13, directing a portion of output light to the tracking controller with an optical tap.

16. The method of claim 13, comprising optically tracking the null of an undesired multiplexed signal.

17. The method of claim 13, comprising rejecting an undesired signal at the PBS output.

18. The system of claim 11, wherein each reception channel is independently optimized.

19. The method of claim 11, comprising coupling each receiver to one reception channel.

20. The method of claim 11, comprising evaluating a power and, optionally a phase of a second signal marker, and sends an adjustment control signal to a polarization controller.

* * * * *